UNITED STATES PATENT OFFICE 2,392,181

DIPHENYLAMINE AZO DYESTUFFS

Robert P. Parker, Somerville, and Corris Mabelle Hofmann, Bound Brook, N. J., assignors to American Cyanamid Company, New York, N. Y., a corporation of Maine No Drawing. Application July 3, 1944,
Serial No. 543,437

6 Claims. (Cl. 260—152)

This invention relates to a new series of diphenylamine azo dyestuffs derived from a tetrahydrofufuryloxy amino diphenylamine.

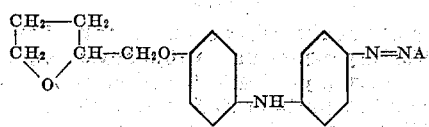

in which A stands for the radical of a coupling component.

In the past there has been a demand for ice-colors having strong blue to violet shades. Many attempts have been made to produce such dyestuffs and in many cases the fastness properties such as fastness to light, heat and washing have left much to be desired. It is an advantage of the present invention that ice-colors of strong blue to violet shades can be produced which as pigments or dyes exhibit superior fastness properties such as fastness to light, heat and washing.

The present invention is not limited to ice-colors as the tetrahydrofurfuryloxy amino diphenylamine after diazotization may be coupled with a variety of other coupling components such as, for example, those containing solubilizing groups producing dyestuffs which are soluble in water and which are capable of dyeing as acid or direct dyestuffs. The ice-colors producible by the present invention are particularly outstanding in their properties and therefore constitute the preferred embodiment of the present invention.

The present invention is, of course, not concerned with the process used in preparing the diphenylamines. These compounds and a process of making them form a subject matter of our copending application Serial No. 543,436, filed July 3, 1944. In general, they may be prepared by reacting 4'-hydroxy-4-nitro diphenylamine with a tetrahydrofurfuryl ester in the presence of an acid binding substance following by reduction of the nitro group in acid or alkaline medium, the pH determining whether the compound is obtained in the form of the free base or a salt thereof.

In the process of diazotization higher temperature, greater concentration of the base and higher mineral and nitrous acid concentrations tend to produce the N-nitroso derivative of the diazonium salts, while at lower temperature, lower acid concentration and by slower addition of nitrite the diazonium compounds are produced. In general, it is desirable to prevent production of the nitroso derivative as this product gives duller and less desirable shades on coupling. However, it is possible to hydrolyze the N-nitroso dyestuffs in dilute solution by heating with alkalies such as soda ash. If desired, reducing agents such as sodium sulfide or sodium bisulfite and the like may be included in the hydrolysis step in order to destroy nitric oxides as they are liberated.

In their diazotized form, these bases may be coupled either with or without a substrate, to yield dyestuffs or pigments of great value because of their strength, variety of shade and fastness properties. In particular, however, these bases are important for the production of fast blue prints or dyeings upon cellulosic materials which are the preferred form of the present invention. These are produced in general, by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases.

Solutions of the diazotized bases used to prepare the products of the present invention may also be treated with inorganic alkali metal salts or alkaline-earth metal salts, or with mixtures of these salts together with appropriate inorganic metal salts whereupon the diazonium salts or metal salt complexes of the diazonium salts are precipitated. These may be separated, dried, stored or blended with inorganic salts such, for example, as with sodium or potassium chlorides, sulfates, magnesium sulfate, aluminum sulfate and the like; the latter preferably being used in their partially dehydrated forms. Such products may be readily dissolved in water to yield solutions from which cellulosic materials which have previously been impregnated in alkaline grounding baths with appropriate ice-color coupling components may be suitably pad dyed, or the solutions may be appropriately thickened and printed upon the prepared cellulosic fabrics.

The bases used in the present invention may also be converted into a diazo-sulfonate which may be isolated from solution, dried, stored or they may be blended in the dry state with appropriate ice-color coupling components and oxidizing agents. Such blends may be incorporated into a printing paste, printed upon vegetable fibers and the pigment developed by treatment with steam, or by steam in the presence of weak acid vapors.

Substantially any of the ice-color coupling components are generally useful for production of insoluble, developed dyes, and enable the production of a variety of colors from yellow to blue. However, for the present purposes, the use of arylides of 2-hydroxy-3-naphthoic acid is preferable. These produce, when coupled with the diazotized bases under the present invention, the most desirable blue to violet shades.

However, the invention is not necessarily so limited. Among other ice-color coupling components which produce useful products may be listed by way of example such compounds as beta-naphthol, 8-amino-2-naphthol, 8-acetyl-amino-2-naphthol, benzoyl naphthols; pyrazolones and pyrazyl pyrazolones; hydroxy benzofluorenones; hydroxy derivatives of phenyl naphthylamines such as 7-hydroxy-1-naphthyl-m-hydroxyphenyl-amine; the various N-substituted amides such as arylides of 5,6,7,8-tetrahydro-2-hydroxy-3-naphthoic acid, of 2-hydroxy-3-anthroic acid, of methyl and dimethyl salicyclic acids, of hydroxy carbazole carboxylic acids, of hydroxy benzocarbazole carboxylic acids, of hydroxy-benzoacridone carboxylic acids, of 3,7-dihydroxy-naphthalene-2,6-dicarboxylic acid, of hydroxy-dibenzofuran carboxylic acids, of hydroxy benzothiophene carboxylic acids, etc., and the arylides of acetoacetic acid, furoyl acetic acid, benzoyl acetic acid, terephthaloyl-bis-acetic acid and the like. The arylide group in the coupling component may be a simple aromatic group such as the radical of aniline or of an aniline derivative or of a naphthylamine, or it may be the radical of a heterocyclic amine, such as, e. g., of an amine of the benzothiazole series or of a diamine of the diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicyclic acid, resorcinol, m-phenylene diamine, the large number of naphthol-sulfonic acids such as e. g., R acid, G acid, the Cleve's acids, J acid, gamma acid, J-acid urea and J-acid imide, H-acid and many others. Pyrazolones such as sulfonic derivatives of 1-phenyl-3-methyl pyrazolone-5 also may be used.

The invention will be more fully illustrated in conjunction with the following examples which are meant to be illustrative only and not by way of limitation. All parts are by weight unless otherwise noted.

Example 1

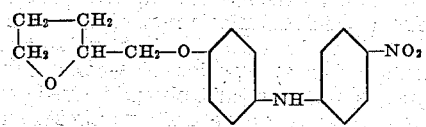

23 parts of 4'-hydroxy-4-nitro diphenylamine are dissolved in 50 parts of water by the addition of 4.4 parts of sodium hydroxide in a suitable reaction vessel and the solution is heated to reflux temperature. 28.2 parts of tetrahydrofurfuryl para-toluene sulfonate are dropped in slowly and the reaction is completed by refluxing for four hours. The reaction mixture is cooled and the 4'-tetrahydrofurfuryloxy-4-nitro diphenylamine is allowed to settle. The supernatant liquor is removed and the crude product is of sufficient purity for direct use.

Example 2

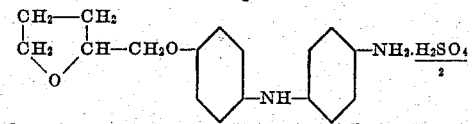

9.4 parts of the nitro compound as obtained in Example 1 are stirred together with 17.8 parts of alcohol and 36.9 parts of a 45% sodium sulfhydrate solution and the whole is refluxed until reduction is complete. The addition of 75 parts of water precipitates an oil which is extracted with ether. The ether extract is separated from the reduction mixture, is washed by decantation with water and is then treated with 3 parts of concentrated sulfuric acid. An oil is precipitated from the ether solution which is separated and is dissolved in 125 parts of water. After clarification of the aqueous solution in the presence of decolorizing carbon, the neutral sulfate of 4'-tetrahydrofurfuryloxy-4-amino diphenylamine is salted out by the addition of sodium sulfate.

Example 3

3.1 parts of the neutral sulfate salt of 4'-tetrahydrofurfuryloxy-4-amino diphenylamine as obtained in Example 2 are dissolved in 35 parts of water and 12 parts of 17% hydrochloric acid are added. The resulting solution is iced to 15° C. and a solution of 0.83 part of sodium nitrite in 11 parts of water is slowly added until diazotization is complete. The resulting diazo solution is clarified by filtration in the presence of decolorizing carbon at 40° C. and the resulting filtrate is treated with sodium chloride. The precipitated diazonium chloride derived from 4'-tetrahydrofurfuryloxy-4-amino-diphenylamine is separated by filtration and is dried at low temperature.

Example 4

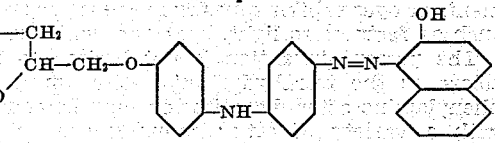

2.3 parts of the dry diazonium chloride obtained as described in Example 3 are blended by grinding with one part of magnesium sulfate dihydrate and one part of anhydrous sodium sulfate to a homogeneous powder.

0.4 part of this color blend is stirred in 2.5 parts of methanol and the slurry is treated with a mixture of 1.5 parts of beta-naphthol in 2.5 parts of methanol containing 5.0 parts of pyridine. The mixture changes to a deep blue-black slurry immediately and a thick paste results. This is stirred while heated on a steam bath for 10 minutes and is then diluted with 300 parts of water and the solution is made alkaline with 10 parts of 20% sodium hydroxide solution. The precipitated pigment is flocculated by digestion on a steam bath, is filtered off, is washed with hot water and is dried at 55° C.

A deep blue-black powder results, insoluble in water.

Example 5

2 parts of the blended diazonium chloride prepared as described in Example 4 are dissolved in 28 parts of water and the solution is thickened by the addition of 70 parts of a suitable carbohydrate thickener. The printing paste is printed on cotton piece goods previously impregnated with the anilide of 2-hydroxy-3-naphthoic acid by the customary procedure in an alkaline bath, the print is dried, is cleared in a 2% soda ash solution at 70° C., is soaped at 65° C. in a 1½% soap solution, rinsed and dried.

The pattern is printed a bright blue of very good fastness properties.

*Example 6*

The blended diazonium chloride as prepared in Example 4 is used to produce developed dyeings on cotton fabric by the following procedure:

Cotton fabric is treated in alkaline grounding baths comprising 5 parts of ice color coupling component, 5 parts of methanol, 20 parts of 20% sodium hydroxide solution and 470 parts of water. The treated cloth is passed between squeeze rolls and is immediately dried at 65° C.

5 parts of a fabric so treated is entered in a dye bath containing 0.3 part of the dry blended mixture of diazonium chloride dissolved in 150 parts of water and while the fabric is efficiently agitated, 5 parts of 20% sodium acetate solution are run in.

When full color development is obtained, the fabric is rinsed in warm water, is cleared at 70° C. in an alkaline solution (3% soda ash and 2% sodium hydroxide) for 2 minutes, then treated at 70° C. in a ½% soap solution, rinsed in fresh water and dried.

The colors obtained with various ice color coupling components are listed below:

| Coupling component | Color |
|---|---|
| 2-hydroxy-3-naphthoic acid-(2'-ethoxyanilide). | Reddish shade of blue. |
| 2-hydroxy-3-naphthoic acid-(2'-naphthylamide). | Strong greenish blue. |
| Bis-(acetoacetic)-ortho-tolidide. | Golden yellow. |
| 2-hydroxy-3-carbazole carboxylic acid-(2'-methyl anilide). | Purple. |
| 2-hydroxy-3-naphthoic acid-(4'-chloroanilide). | Bright greenish blue. |

*Example 7*

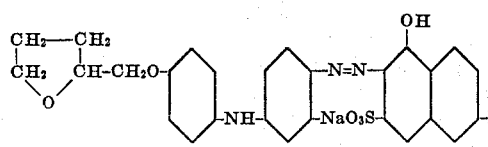

1.7 parts of the sulfate salt of 4-tetrahydrofurfuryloxy-4-aminodiphenylamine produced as described above in Example 2 are stirred in 30 parts of water and are dissolved by the addition of 4 parts of 17% hydrochloric acid. The temperature is adjusted at 15° C. and the slurry is diazotized by the slow addition of 3.5 parts of 10% sodium nitrite solution.

1.4 parts of 5,5'-dihydroxy-2,2'-dinaphthylurea-7,7'-disulfonic acid are dissolved in 40 parts of water and 3.1 parts of soda ash are dissolved in the solution. The temperature is adjusted at 10° C. and the above prepared diazo solution is slowly dropped in with efficient agitation. Coupling is immediate with the formation of a deep blue color. The solution is treated with sodium chloride until the dyestuff is completely salted out and the dyestuff is isolated by filtration.

After drying at 40° C., a deep blue-black solid is obtained which is readily soluble in water, yielding a blue solution.

*Example 8*

0.5 part of the dyestuff as obtained in Example 7 is dissolved in 500 parts of water. 50 parts of this standard solution are diluted with 250 parts of water and 3.5 parts of 10% Glauber's salt and 1 part of 10% sulfuric acid are added. 5 parts of a woolen skein are well boiled out in 1% soap solution, rinsed in fresh water, wrung out and entered into this dye bath. The temperature is raised to the boil and is maintained thus for one hour while the woolen skein is well agitated. After removal from the dye bath, the wool is rinsed in hot water, soaped in ½% soap solution at 65° C., rinsed again and finally dried.

The skein is levelly dyed a royal blue of distinctive brightness.

*Example 9*

50 parts of the standard dye solution prepared as described in Example 8 are diluted with 150 parts of water and 15 parts of a 10% sodium chloride solution are added. 5 parts of a previously wet out cotton skein are entered into this dye bath and are agitated efficiently while the temperature is slowly raised to the boil. The dye bath is maintained at the boil until color development is complete as is indicated by exhaustion of the dye bath. The skein is removed, is rinsed, treated at 65° C. in a 1% soap solution, again rinsed and dried.

The skein is evenly dyed a bright greenish blue shade of excellent wash and light fastness.

We claim:

1. Azo coloring matter having the following formula.

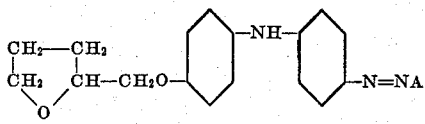

in which A is the residue of a coupling component.

2. Azo coloring matter having the following formula:

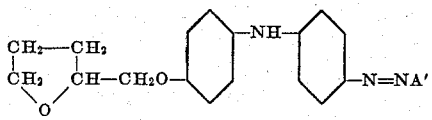

in which A' is the residue of an ice coupling component.

3. Azo coloring matter having the following formula:

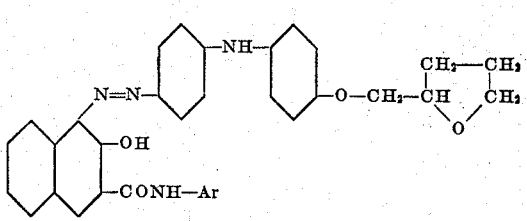

in which Ar is aryl.

4. Azo coloring matter having the following formula:
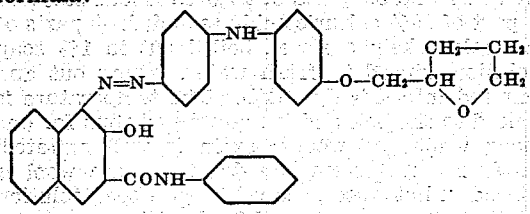
5. Azo coloring matter having the following formula:
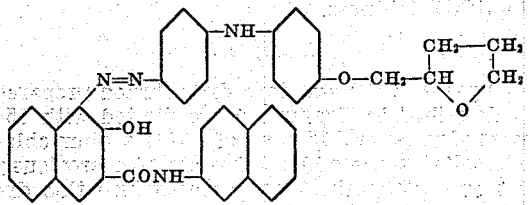
6. Azo coloring matter having the following formula:
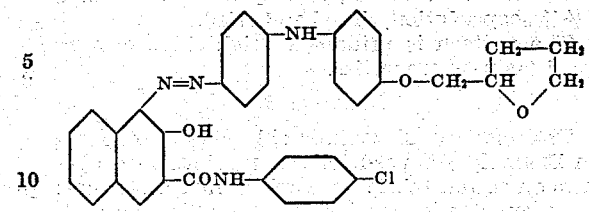
ROBERT P. PARKER.
CORRIS MABELLE HOFMANN.